Patented Apr. 16, 1940

2,197,709

UNITED STATES PATENT OFFICE 2,197,709

ACYL STYRENES

Anderson W. Ralston and Robert J. Vander Wal, Chicago, Ill., assignors to Armour and Company, Chicago, Ill., a corporation of Illinois No Drawing. Application April 11, 1938, Serial No. 201,425

5 Claims. (Cl. 260—592)

This invention relates to acylated styrenes and it comprises, as new compounds, ketones having the generic structure CH=CH—$C_6H_4$COR wherein R is an alkyl radical having eleven or more carbon atoms.

We have discovered a new class of compounds which can be made from the higher fatty acids and which have chemical and physical properties of marked technical and commercial interest, especially in the synthetic plastic field. We have discovered that the higher fatty acid chlorides, such as stearyl chloride, myristyl chloride, lauryl chloride, oleyl chloride, linoleyl chloride, linolenyl chloride and other fatty acid chlorides derived from fatty acids of twelve of more carbon atoms, can be made to react with styrene under mild Friedel-Crafts conditions to give acylated styrenes having valuable properties as plasticizers for resins or as starting material per se for synthetic plastics. These acylated styrenes are waxy solids when first prepared but polymerize rapidly to transparent, flexible, glass-like solids.

We have found these acylated styrenes to be excellent plasticizers for styrene or vinyl resins and we attribute this property to the fact that in our acylated styrenes the olefinic bond of the styrene remains intact and that the acylated styrenes polymerize at the olefinic bond with styrene or vinyl compounds in such a manner that the acylated styrenes become a part of the resin itself and are not merely dissolved or dispersed in it. These acylated styrenes react in all proportions with styrene or vinyl compounds giving a variety of very plastic, transparent resins.

In the preparation of acylated styrenes by Friedel-Crafts great care must be exercised to avoid substitution at the olefinic bond since, as explained above, the unusual properties of these acylated styrenes are dependent upon the presence of this bond which can be polymerized with other substances having unsaturated linkages. In other words, our acylated styrenes in all cases possess the aryl group attached to the phenyl radical and the olefinic bond remains unaltered. Our acylated styrenes are thus represented by the following general structure:

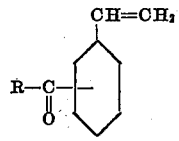

but the position of the

group in the phenyl ring is not clearly established.

The following examples illustrate the method of preparation, properties and uses of our acylated styrenes.

EXAMPLE 1

Stearoyl styrene 11.5 grams of styrene are added to a suspension of 15 grams of aluminum chloride in 75 cc. of chlorobenzene contained in a three-necked flask equipped with a stirrer and reflux condenser. The mixture of aluminum chloride and chlorobenzene is cooled to 15° C. before the addition of the styrene. 30 grams of stearyl chloride are then added by means of a dropping funnel over a period of one hour. The temperature is maintained at 20° to 30° C. during the addition of the stearyl chloride. After the addition the reaction mixture is heated at from 40° to 45° C. for one hour. The reaction mixture is then hydrolyzed by pouring on ice and the solvent removed by steam distillation. The oily product is washed with warm water, extracted with ether and the ether solution dried by anhydrous sodium sulfate. The solution is filtered and the ether evaporated under a vacuum. The temperature during the evaporation of the ether is not allowed to rise over 65° C. 33 grams of stearoyl styrene are obtained, which is a yield of 89%. The compound is a waxy, amorphous solid melting at 36° C., with an iodine value of 66. After standing for several days the stearylated styrene undergoes polymerization, giving a transparent, amorphous solid with an iodine value of 35.

When a film of the melted stearylated styrene is spread upon glass and held at room temperatures it polymerizes to a transparent, flexible film. Polymerization is greatly accelerated by heating to 100° C. Samples of the stearoyl styrene were mixed with styrene and the mixtures polymerized. The percentages were varied from 2 to 75% ketone. In all cases the mixtures could be polymerized to transparent plastics, the degree of flexibility being proportional to the amount of acylated styrene present.

EXAMPLE 2

Oleoyl styrene

A mixture of 11.5 grams of styrene, 15 grams of aluminum chloride and 75 cc. of chlorobenzene is prepared, as previously described. This is reacted with 30 grams of oleyl chloride and the product hydrolyzed and purified as in the previous example. The acylated styrene is a solid, melting at about room temperature. It polymerizes rapidly to an amorphous solid and upon heating or prolonged exposure it forms a transparent, flexible plastic.

EXAMPLE 3

Linoleoyl styrene

This ketone is prepared as described under

Example 1 with the exception that linoleyl chloride is substituted for the stearyl chloride. The product after purification is a very viscous liquid which possesses no true melting point. It polymerizes rapidly upon exposure to air or upon heating and gives a transparent plastic product.

EXAMPLE 4

*Linolenoyl styrene*

This product is prepared by reacting linolenyl chloride with styrene under conditions similar to those described under Example 1. The product is a viscous oil which rapidly polymerizes to a glass-like solid.

EXAMPLE 5

*Lauroyl styrene*

21 grams of lauryl chloride are reacted with 11.5 grams of styrene by a Friedel-Craft procedure as described under Example 1. The product after purification melts at 31° C. and has an iodine value of 86. It polymerizes slowly to a transparent, amorphous solid, the change being accompanied by a drop in iodine value.

We have more particularly described the preparation and properties of acylated styrenes in which the alkyl group contains seventeen carbon atoms and can be saturated or unsaturated. We have also described the lauroyl styrene derivatives. Acylated styrenes having thirteen carbon atoms in the alkyl group can be readily prepared from myristyl chloride and styrene, and those having fifteen carbon atoms from palmityl chloride.

The desirable chemical and physical properties of our acylated styrenes are essentially dependent upon the degree of unsaturation. Those prepared from fatty acid chlorides such as linolenyl chloride possess exceptional tendencies to polymerize and form plastics. We have prepared plastic compositions by polymerizing the acylated styrenes themselves or by incorporating various percentages of them in styrene or vinyl compounds and resinifying the mixture. In every case the acylated styrene is chemically combined in the plastic composition. Those prepared from unsaturated acid chlorides polymerize with greater rapidity than those from the saturated acid chlorides. All the acylated styrenes described above and also their polymerization products are insoluble in water and alcohol and soluble in benzene and xylene. Whenever they are incorporated into a styrene or vinyl resin before polymerization they impart a high degree of plasticity to the finished plastic. Those prepared from saturated acid chlorides appear to impart more plasticity to the finished resin than those prepared from unsaturated acid chlorides although they do not polymerize as rapidly. The acylated styrenes can be incorporated into paints, lacquers, etc. to impart plasticity to the films thereof or they can be dissolved in organic solvents and used as lacquers per se.

We wish to clearly distinguish our products from plastics plasticized by fatty acids or fatty acid chlorides. All of the products of our invention are acylated styrenes and possess a ketone structure. They differ fundamentally from products obtained by reacting fatty acids or their derivatives with the plastics either before or after polymerization.

In the above examples we have confined ourselves to pure acylated styrenes prepared from styrene and fatty acid chlorides. We can, of course, use mixed fatty acid chlorides, such as those prepared from the fatty acids of coconut oil, lard, cottonseed oil, fish oils, linseed oils or synthetic acids. All of these substances are satisfactory starting materials for the preparation of our acylated styrenes.

All of the above acylated styrenes have been made by a Friedel-Craft procedure and we do not intend our invention to include products obtained by reaction of the olefinic bond of the styrene with the acid chloride, which products would differ entirely in chemical and physical characteristics from those described above.

Having thus described our invention, what we claim is:

1. An acyl styrene in which the aliphatic hydrocarbon radical of the acyl group contains at least eleven carbon atoms.

2. An acyl styrene in which the aliphatic hydrocarbon radical of the acyl group contains seventeen carbon atoms.

3. Stearoyl styrene.
4. Oleoyl styrene.
5. Linoleoyl styrene.

ANDERSON W. RALSTON.
ROBERT J. VANDER WAL.